(12) United States Patent
Balakrishnan et al.

(10) Patent No.: US 9,110,724 B2
(45) Date of Patent: Aug. 18, 2015

(54) SELECTING COMPUTING NODES IN CLOUD SERVICE USING REPLICATION TOPOLOGIES

(75) Inventors: Mahesh Balakrishnan, San Jose, CA (US); Marcos K. Aguilera, Mountain View, CA (US); Birjodh Tiwana, Ann Arbor, MI (US); Hitesh Ballani, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1029 days.

(21) Appl. No.: 13/022,635

(22) Filed: Feb. 8, 2011

(65) Prior Publication Data

US 2012/0203888 A1 Aug. 9, 2012

(51) Int. Cl.
*G06F 15/173* (2006.01)
*G06F 9/50* (2006.01)
*G06F 11/20* (2006.01)

(52) U.S. Cl.
CPC ............ *G06F 9/505* (2013.01); *G06F 11/2094* (2013.01)

(58) Field of Classification Search
USPC .................... 709/201–226, 200; 711/114–163
See application file for complete search history.

(56) References Cited

U.S. PATENT DOCUMENTS

| 6,335,937 | B1 | 1/2002 | Chao et al. |
| 6,457,011 | B1 | 9/2002 | Brace et al. |
| 7,069,071 | B2 | 6/2006 | Stoycos et al. |
| 7,778,972 | B1 | 8/2010 | Cormie et al. |
| 7,817,647 | B2 | 10/2010 | Lieuallen et al. |
| 8,312,237 | B2 * | 11/2012 | Koziy et al. .................... 711/162 |
| 8,321,558 | B1 * | 11/2012 | Sirota et al. .................... 709/224 |
| 8,370,312 | B1 * | 2/2013 | Sawhney et al. ............. 707/694 |
| 2008/0183973 | A1 | 7/2008 | Aguilera et al. |
| 2008/0304421 | A1 | 12/2008 | Ramasubramanian et al. |
| 2010/0199042 | A1 * | 8/2010 | Bates et al. .................... 711/114 |

OTHER PUBLICATIONS

Ramnarayan, Jags, "SQLFabric—Gemstone Community", Retrieved at << http://community.gemstone.com/display/sqlfabric/SQLFabric >>, Apr. 30, 2010, pp. 9.

Lesem, Steve, "Cloud Storage Strategy—Cloud Database Archives", Retrieved at << http://cloudstoragestrategy.com/cloud-database/ >>, Nov. 17, 2009, pp. 12.

(Continued)

*Primary Examiner* — El Hadji Sall
(74) *Attorney, Agent, or Firm* — Heikki Einola; Judy Yee; Micky Minhas

(57) ABSTRACT

A cloud statistics server generates statistics for a cloud service based on an identified data item and an identified operation. The cloud service may include various computing nodes and storage nodes. The cloud statistics may include expected completion times for the identified operation and the identified data item with respect to each of the computing nodes. A computing node may be selected to execute the identified operation based on the expected completion times. The generated statistics may be generated by the cloud statistics server using a network topology associated with the data item that is based on the latencies or expected transfer times between the various storage nodes and computing nodes, and a replication strategy used by the cloud service. The topology may be implemented as a directed graph with edge weights corresponding to expected transfer times between each node.

20 Claims, 6 Drawing Sheets

(56) References Cited

OTHER PUBLICATIONS

"Gem Fire Product Options", Retrieved at << http://www.springsource.com/products/data-management/options >>, Retrieved Date: Oct. 21, 2010, p. 1.

Agarwal, et al., "Volley : Automated Data Placement for Geo-Distributed Cloud Services", Retrieved at << http://citeseerx.ist.psu.edu/viewdoc/download?doi=10.1.1.165.1560&rep=rep1 &type=pdf >>, Proceedings of the 7th USENIX conference on Networked systems design and implementation, 2010, pp. 16.

Belaramani, et al., "PADS : A Policy Architecture for Distributed Storage Systems", Retrieved at << http://www.belaramani.org/nalini/papers/pads.pdf >>, Proceedings of the 6th USENIX symposium on Networked systems design and implementation, 2009, pp. 15.

Dabek, et al., "Vivaldi : A Decentralized Network Coordinate System", Retrieved at << http://cgis.cs.umd.edu/class/spring2007/cmsc711/papers/vivaldi.pdf >>, Proceedings of the conference on Applications, technologies, architectures, and protocols for computer communications, Aug. 30-Sep. 3, 2004, pp. 12.

Madhyastha, et al., "IPlane: An Information Plane for Distributed Services", Retrieved at << http://iplane.cs.washington.edu/osdi06.pdf >>, In Proceedings of the 7th USENIX Symposium on Operating Systems Design and Implementation, Nov. 2006, pp. 367-380.

Ramasubramanian, et al., "On the Treeness of Internet Latency and Bandwidth", Retrieved at << http://pages.cs.wisc.edu/~akella/papers/sequoia.pdf >>, ACM Sigmetrics/Performance Joint International Conference on Measurement and Modeling of Computer Systems, Jun. 15-19, 2009, pp. 12.

Wong, et al., "Meridian: A Lightweight Network Location Service without Virtual Coordinates", Retrieved at << http://conferences.sigcomm.org/sigcomm/2005/paper-WonSli.pdf >>, Proceedings of the conference on Applications, technologies, architectures, and protocols for computer communications, Aug. 22-26, 2005, pp. 12.

* cited by examiner

400

SELECTING COMPUTING NODES IN CLOUD SERVICE USING REPLICATION TOPOLOGIES

BACKGROUND

Existing cloud services provide developers storage services with simple, data-centric interfaces to store and retrieve data items. Behind such simple interfaces, these services use complex machinery to ensure that data is available and persistent in the face of network and node failures. As a result, developers can focus on application functionality without having to reason about complex failure scenarios.

Unfortunately, this simplicity comes at a cost as applications have little or no information regarding the location of data items in the network. Without this information, applications cannot optimize their execution by moving computation closer to the data items, data items closer to users, or related data items closer to one another. These kinds of optimizations can be crucial for applications executing across different data centers (where network latencies can be very high), as well as within hierarchical data center networks (where bandwidth can be limited).

Current solutions involve guesswork. For example, the cloud service may determine a location for the storage of a data item for an application by predicting the future access patterns of the application based on past history. This approach can be expensive and counter-productive, since the application typically has more accurate information than the cloud about its own future behavior. In addition, without input from the application, the cloud service can optimize only simple aggregates of low-level metrics such as bandwidth usage.

SUMMARY

A cloud statistics server is provided that generates statistics for a cloud service based on an identified data item and an identified operation. The cloud service may include various computing nodes and storage nodes. The cloud statistics may include expected completion times for the identified operation and the identified data item with respect to each of the computing nodes. A computing node may then be selected to execute the identified operation based on the expected completion times. The generated statistics may be generated by the cloud statistics server using a network topology associated with the data item that is based on the latencies or expected transfer times between the various storage nodes and computing nodes, and a replication strategy used by the cloud service. The topology may be implemented as a directed graph with edge weights corresponding to expected transfer times between each node.

In an implementation, an identifier of a data item and an identifier of an operation are received at a computing device. The data item is stored by a cloud service. A topology is requested from the cloud service using the identifier of a data item. The topology is received from the cloud service by the computing device. The topology identifies one or more storage nodes from the plurality of storage nodes used to store the identified data item and a replication strategy used by the identified storage node(s). For each computing node of a subset of the plurality of computing nodes, an expected completion time for the computing node to complete the identified operation on the identified data item is determined given the replication strategy used by the identified storage node(s). A minimum expected completion time is determined and is provided. An identifier of the computing node associated with the determined minimum expected completion time is provided.

In an implementation, an identifier of an operation, an identifier of a data item, and a time constraint are received. The data item is stored in a cloud service. A topology is requested and received from the cloud service by the computing device using the identifier of a data item. The topology identifies one or more storage nodes used to store the identified data item, and a replication strategy used by the storage node(s). The replication strategy includes one or more expected transfer times associated with each of the identified storage nodes and the computing nodes. The expected transfer times associated with each computing node and the identified storage node(s) are combined according to the replication strategy to generate an expected completion time for each computing node. One or more computing nodes with an expected completion time that is less than the time constraint are determined. Identifiers of the determined computing nodes are provided.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
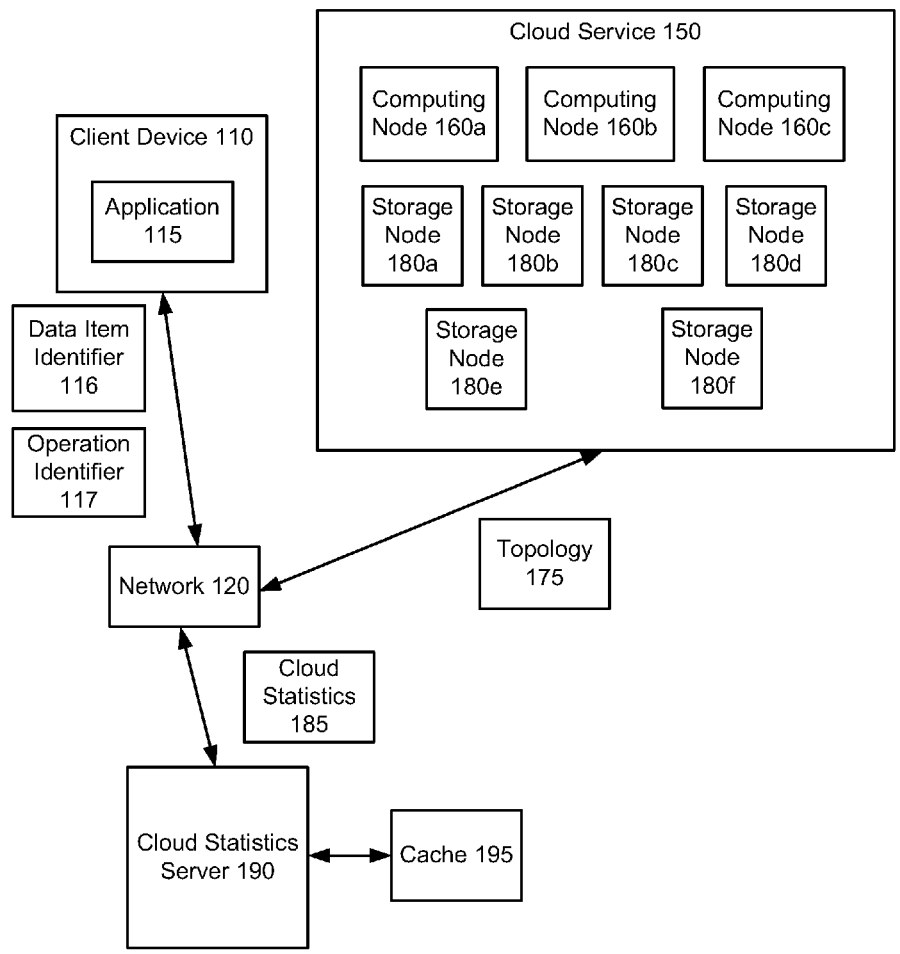
FIG. 1 is an illustration of an example environment using a cloud statistics server.

FIG. 1 is an illustration of an example environment 100 using a cloud statistics server 190. The environment 100 may include a client device 110, a cloud service 150, and the cloud statistics server 190 in communication with one another through a network 120. The network 120 may be a variety of network types including the public switched telephone network (PSTN), a cellular telephone network, and a packet switched network (e.g., the Internet).

In some implementations, a client device 110 may include a desktop personal computer, workstation, laptop, PDA, cell phone, or any WAP-enabled device or any other computing device capable of interfacing directly or indirectly with the network 120. A client device 110 may be implemented using a general purpose computing device such as that described with respect to FIG. 7, for example. While only one client device 110 is shown, it is for illustrative purposes only; there is no limit to the number of client devices 110 that may be supported.

The cloud service 150 may provide distributed data storage and data processing services to the client device 110. The cloud service 150 may be implemented using a variety of cloud computing systems such as AZURE by MICROSOFT. Other cloud services may be used.

The cloud service 150 may include a plurality of computing nodes (i.e., computing nodes 160a, 106b, and 160c), and a plurality of storage nodes (i.e., storage nodes 180a, 180b, 180c, 180d, 180e, and 180f). The computing nodes 160a-c may provide computation services to the client device 110. Similarly, the storage nodes 180a-f may provide storage services for one or more data items to the client device 110. Each of the computing nodes 160a-c and the storage nodes 180a-f may be implemented using one or more general purpose computing devices such as that described with respect to FIG. 7, for example. While only three computing nodes 160a-c and six storage nodes 180a-f are shown, it is for illustrative purposes only; there is no minimum or maximum number of computing nodes and storage nodes that may be supported.

The cloud service 150 provides an abstraction of the various computing nodes 160a-c and storage nodes 180a-f that perform the storage and data processing services for the client device 110. Thus, a user of the client device 110 typically may not know the particular computing nodes and storage nodes that are providing the services to the client device 110. Moreover, the client devices are typically not aware of the geographical locations of the nodes that provide services to the client devices, how the various nodes are connected to one another, and the replication strategies used by the nodes protect the data.

To provide redundancy and protect the integrity of the data items stored by the storage nodes 180a-f, the cloud service 150 may implement one or more replication strategies. The replication strategies may include caching, synchronous mirroring, asynchronous mirroring, erasure coding, and striping, for example. Other replication strategies may also be used.

The client device 110 may execute an application 115 or more than one application. The application 115 may be a software program that uses one or more services provided by the cloud service 150. The application 115 may include a variety of applications including email applications, file sharing applications, and social networking applications, for example. While only one application 115 is shown, it is for illustrative purposes only; there is no limit to the number of applications that may be supported. Moreover, while the application 115 is shown as part of the client device 110, in some implementations, the application 115 may also be implemented as part of the cloud service 150. For example, in some implementations, the application 115 may be implemented as part of a gateway or load-balancing node associated with the cloud service 150.

The application 115 may request the performance of one or more operations by the cloud service 150. The application 115 may request the performance of an operation by providing an operation identifier 117 of the operation to the cloud service 150. The operations may include update operations and read operations. Other operations may be supported.

In some implementations, the application 115 may further include a data item identifier 116 of a data item along with the operation identifier 117. For example, where the identified operation is a read operation or an update operation, the data item identifier 116 may identify the data item (e.g., a file) to read or update.

The environment 100 may further include a cloud statistics server 190. The cloud statistics server 190 may expose an application programming interface that the application 115 may use to request one or more cloud statistics 185 using the data item identifier 116 and/or the operation identifier 117. In some implementations, the cloud statistics 185 may identify an expected computing time or a minimum computing time for the identified operation to be completed by the cloud service 150. The cloud statistics 185 may further identify a computing node that is capable of performing the identified operation within the expected or minimum computing time. Other cloud statistics 185 may be supported. The application 115 may then select or cause a computing node to perform the identified operation based on the cloud statistics 185.

In some implementations, the cloud statistics server 190 may generate cloud statistics 185 based on one or more constraints provided by the application 115. The constraints may include a minimum completion time for an identified operation or a sequence of identified operations. For example, the application 115 may request cloud statistics 185 that identify one or more computing nodes that can execute a particular sequence of read and update operations in less than 40 milliseconds. Other constraints may also be supported.

In some implementations, the cloud statistics server 190 may generate the cloud statistics 185 using a topology 175 associated with the cloud service 150. The topology 175 may describe or represent the relationship between the various computing nodes 160a-c and the storage nodes 180a-f of the cloud service 150 as well as the replication strategy used by the cloud service 150. In some implementations, the topology 175 may be represented as a directed graph. The directed graph may include a node for one or more of the computing nodes 160a-c and the storage nodes 180a-f of the cloud service 150. The directed graph may further include edges between the nodes that represent the transmission of data items and/or control messages between the storage nodes according to the replication strategy used by the cloud service 150.

Figure 2:
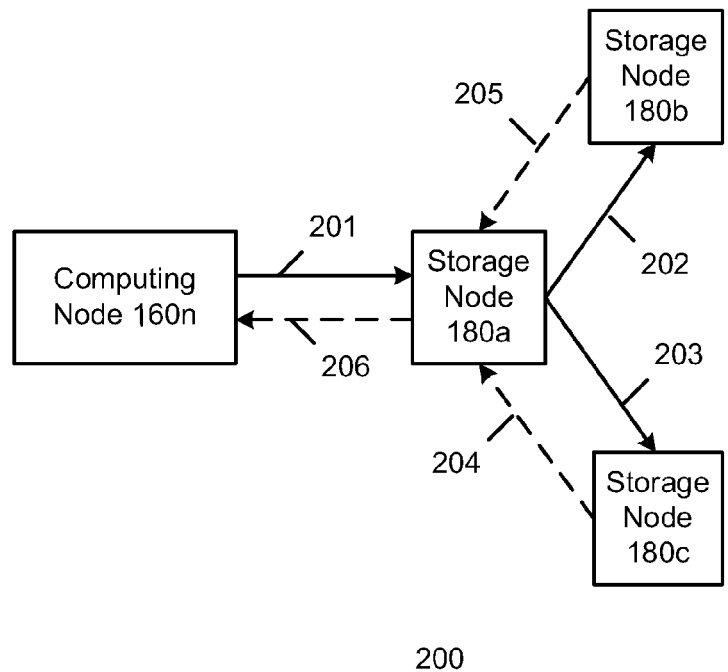
FIG. 2 is an illustration of an example topology using a synchronous mirroring replication strategy.

For example, FIG. 2 is an illustration of a topology 200 representing a synchronous mirroring replication strategy for update operations performed by a cloud server 150. In the synchronous mirroring replication strategy shown, the storage node 180a is a primary storage node in that data items are first written or updated at the storage node 180a. The storage nodes 180b and 180c are secondary storage nodes in that the operations performed at the storage node 180a are replicated on the storage nodes 180b and 180c. A computing node 160n represents the computing nodes 160a-c because any of the computing nodes 160a-c may perform the write or update operation for the cloud service 150. Edges 201, 202, and 203 represent the transmission of data items between the nodes and are illustrated using solid lines. Edges 204, 205, and 206 represent the transmission of control messages and are illustrated using hashed lines.

According to the topology 200, when the computing node 160n receives a write or update operation to perform with respect to a data item, the computing node 160n transmits the data item to storage node 180a as shown by the edge 201. The storage node 180a stores the data item and transmits the data item in parallel to the storage nodes 180b and 180c for redundant storage as shown by the edges 202 and 203. After storing the data item, the storage nodes 180b and 180c send confirmation messages to the storage node 180a as shown by edges 204 and 205. Finally, the storage node 180a sends a confirmation message to the computing node 160n as shown by edge 206.

Figure 3:
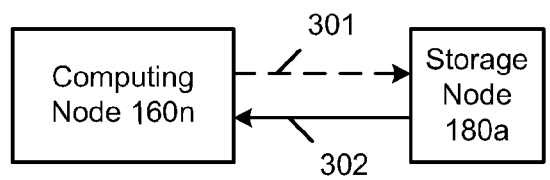
FIG. 3 is an illustration of another example topology using a synchronous mirroring replication strategy.

In another example, FIG. 3 is an illustration of a topology 300 representing synchronous mirroring replication strategy for read operations. Edge 301 represents a control message and is illustrated using a hashed line, and edge 302 represents a transmission of a data item and is illustrated using a solid line. According to the topology 300, the computing node 160n may receive a request to perform a read operation on a data item and may send a request for the data item to the storage node 180a as shown by the edge 301. The storage node 180a may retrieve the data item and provide the data item to the computing node 160n as shown by the edge 302. Because the storage nodes 180b and 180c are redundant storage nodes, no data items are read from either of the storage nodes 180b and 180c.

Figure 4:
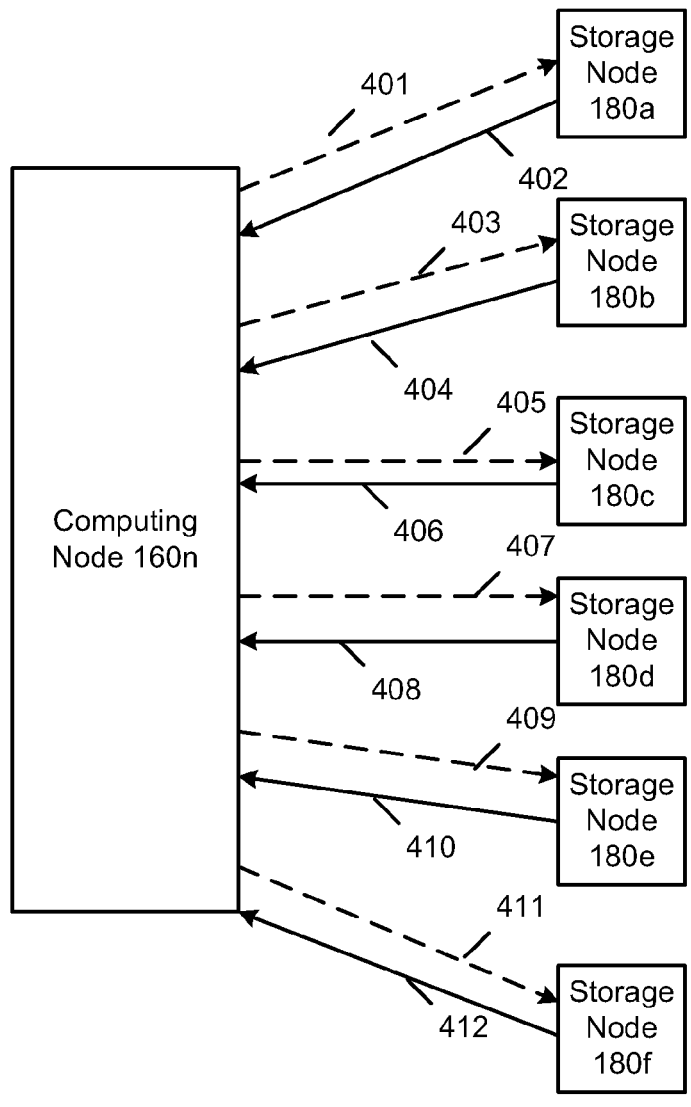
FIG. 4 is an illustration of an example topology using an erasure coding replication strategy.

In yet another example, FIG. 4 is an illustration of a topology 400 representing an erasure coding replication strategy for read operations. The edges 401, 403, 405, 407, 409, and 411 represent the transmission of control messages, while the edges 402, 404, 406, 408, 410, and 412 represent the transmission of portions of a data item.

Erasure coding replication is a method for encoding a data item into n portions, where only k of the n portions are needed to reconstruct the original data item. The erasure coding replication strategy in the implementation shown by the topology 400 is an n=6 and k=4 replication strategy, because the portions of the data item are stored on each of the six storage nodes 180a-f and the data item may be read by the computing node 160n using only four of the six portions. Thus, the computing node 160n may send read requests for the data item to each of the storage nodes 180a-f in parallel using control messages as evidenced by the edges 401, 403, 405, 407, 409, and 411. The computing node 160n may then receive a portion of the data item from each of the storage nodes 180a-f as evidenced by the edges 402, 404, 406, 408, 410, and 412. However, because of the erasure coding replication strategy used, the computing node 160n may begin reading or processing the data item after any four portions of the data item have been received.

In some implementations, the clouds statistics server 190 may request a topology 175 by providing the identifier of a data item 116 and/or the identifier of an operation 117 to the cloud service 150. The cloud service 150 may then provide the requested topology 175 to the cloud statistics server 190. The topology 175 may identify the storage nodes 180a-f associated with the identified data item and the replication strategy used by the identified storage nodes 180a-f.

Alternatively, or additionally, the cloud statistics server 190 may request the topology 175 from a cache 195 associated with the cloud statistics server 190. In some implementations, the cloud statistics server 190 and/or the application 115 may indicate to the cloud server 150 which data items are likely to be read or updated by the application 115. The cloud service 150 may then push or provide a new topology 175 to the cache 195 when the topology 175 associated with an identified data item is changed.

The topologies for a cloud service 150 may be generated by one or more users or administrators familiar with the replication strategies used by the various storage nodes 180a-f, and the operations supported by the computing nodes 160a-c. Alternatively, or additionally, the topologies may be generated automatically by the cloud service 150. The topology 175 may further include one or more weights associated with the edges in between nodes of the topology 175. In some implementations, the weights may be expected transfer times associated with the transfer of data items or control messages between the nodes. For example, an expected transfer time on an edge between the storage node 180a and the storage node 180b of 3 milliseconds may indicate that the exchange of a data item of some predetermined size between the storage node 180a and the storage node 180b may be expected to take 3 milliseconds. Other types of weights may be used. For example, the weight on an edge may represent the cost of transferring data between the nodes connected by the edge.

Where the weights are expected transfer times, the cloud statistics server 190 may determine the cloud statistics 185 for an identified data item and/or operation using the expected transfer times on the edges connecting the one or more storage nodes 180a-f associated with the topology 175 and according to the replication strategy used. Depending on the replication strategy used, these cloud statistics 185 may be determined by combining the expected transfer times using one or more summation, minimum, or maximum operations. For the simplest case, where the cloud statistics 185 include a minimum expected completion time for an identified operation on an identified data item, the cloud statistics server 190 may, for each computing node 160a-c, sum the expected transfer time of each edge traveled by the data item between the storage nodes 180a-f associated with the topology 175 and the computing node 160a-c to determine an expected completion time for the data item with respect to the computing node 160a-c.

For other cases, depending on the topology 175 and/or the replication strategy, other operations besides the summation operation may be used such as the maximum or minimum operations. For example, for the topology 200 illustrated in FIG. 2 representing a synchronous mirroring replication strategy, an expected completion time for an update operation on a data item can be determined by summing the expected transfer time associated with the computing node 160n (i.e., one of computing nodes 160a-c) and the storage node 180a, with the maximum of the expected transfer time between the storage node 180a and the storage node 180b, and the expected transfer time between the storage node 180a and the storage node 180c. As indicated by the edges 202 and 203, the replication of the data item from the storage node 180a and the storage node 180b is performed in parallel, thus the maximum operation may be used to select between the two expected transfer times for the calculation. In addition, the expected completion time calculation may further include the summation of the expected transfer times associated with the transmission of confirmation messages (i.e., edges 204, 205, and 206).

In another example, for the topology 400 illustrated in FIG. 4 representing an erasure coding replication strategy, an expected completion time for a read operation on a data item can be determined based on the fourth fastest expected transfer time between one of the storage nodes 180a-f. As described above, in the erasure coding replication strategy of the example implementation, a data item may be read when four of the six portions of the data item have been received. Assuming that the storage nodes 180a-f transmit their portions of the data item in parallel, the expected completion time is dependent on the data transfer rate of the storage node whose portion of the data item is received fourth and the size of the data item. Thus, the expected completion time may be computed by using a minimum operation on the four fastest expected transfer times.

The cloud statistics server 190 may determine the expected completion time for each computing node 160a-c as described above according to the topology 175, and select the minimum expected completion time for the cloud statistics 185. The cloud statistics server 190 may further include an indicator of the computing node 160a-c with the minimum expected completion time. The application 115 may then cause the identified operation to be performed at the identified computing node 160a-c.

Figure 5:
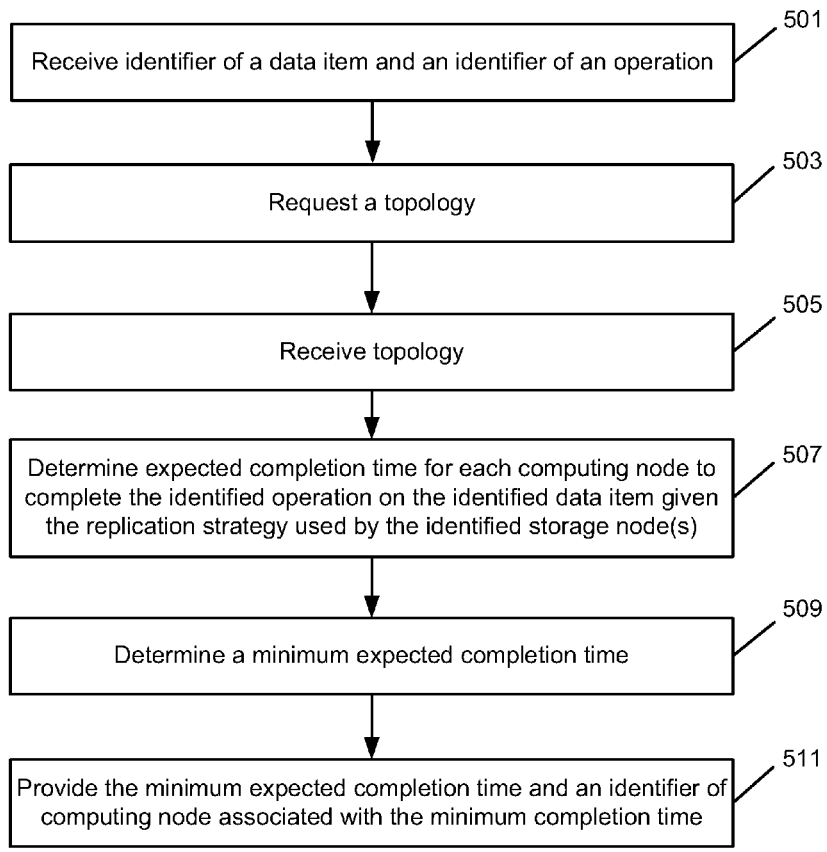
FIG. 5 is an operational flow of an implementation of a method for determining a computing node with a minimum expected completion time for an identified data item and an identified operation.

FIG. 5 is an operational flow of an implementation of a method 500 for determining a computing node with a minimum expected completion time for an identified data item and an identified operation. The method 500 may be implemented by the cloud statistics server 190, for example.

An identifier of a data item and an identifier of an operation are received at 501. The identifiers may be received from an application 115 by the cloud statistics server 190. The data item may be stored in one or more storage nodes of the cloud service 150. The identified operation may be a read operation or an update operation on the identified data item, for example. Other operations may also be supported.

A topology is requested at 503. The topology 175 may be requested by the cloud statistics server 190 from the cloud service 150 using the identifier of the data item and/or the identifier of an operation. Alternatively, the topology 175 may be requested from the cache 195 associated with the cloud statistics server 190. In some implementations, the topology 175 may identify one or more storage nodes used to store the identified data item at the cloud service 150 and a replication strategy used by the identified storage nodes. The replication strategy may include a synchronous mirroring replication strategy illustrated by the topology 200 and the erasure coding replication strategy illustrated by the topology 400, for example. Other replication strategies may also be supported.

The topology is received at 505. The topology 175 may be received by the cloud statistics server 190 from the cloud service 150. Alternatively, the topology 175 may be received by the cloud statistics server 190 from the cache 195.

For each computing node, an expected completion time for the computing node to complete the identified operation on the identified data item given the replication strategy used by the identified one or more storage nodes is determined at 507. The determination may be made by the cloud statistics server 190 using the topology 175. In some implementations, the replication strategy may include one or more expected transfer times associated with the identified one or more storage nodes and the plurality of computing nodes. The cloud statistics server 190 may determine an expected completion time for the identified operation on the identified data item by a computing node by combining the expected transfer times associated with the computing node with one or more of the expected transfer times associated with the identified storage nodes according to the replication strategy. For example, the expected transfer times may be combined using one or more summation, minimum, or maximum operations according to the topology 175.

A minimum expected completion time is determined at 509. The determination may be made by the cloud statistics server 190 from the determined expected completion times for each computing node, for example.

The determined minimum expected completion time and an identifier of the computing node associated with the minimum expected completion time are provided at 511. The determined minimum expected completion time and the identifier of the computing node associated with the minimum expected completion time may be provided by the cloud statistics server 190 to the application 115 as the cloud statistics 185, for example. The application 115 may use the cloud statistics 185 to select a computing node to perform the identified operation on the identified data item. Other statistics may also be provided. For example, the statistics may identify a computing node with the lowest expected computation cost, rather than the minimum expected completion time.

Figure 6:
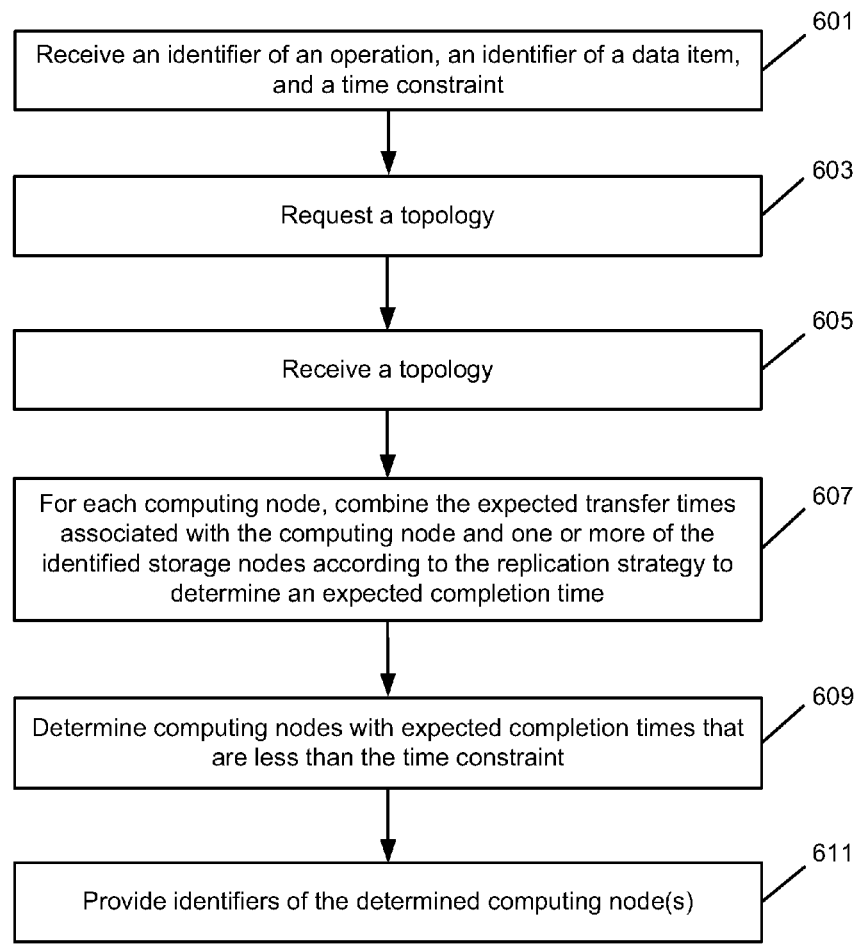
FIG. 6 is an operational flow of an implementation of a method for determining one or more computing nodes capable of completing an identified operation with an expected completion time that is less than a time constraint.

FIG. 6 is an operational flow of an implementation of a method 600 for determining one or more computing nodes capable of completing an identified operation with an expected completion time that is less than a time constraint. The method 600 may be implemented by the cloud statistics server 190, for example.

An identifier of a data item, an identifier of an operation, and a time constraint are received at 601. The identifiers and time constraint may be received from an application 115 by the cloud statistics server 190. The data item may be stored in one or more storage nodes of the cloud service 150. The identified operation may be a read operation or an update operation on the identified data item, for example. In an implementation, the time constraint may be a maximum completion time or a desired completion time for the identified operation.

For example, an email application may want to learn which computing nodes of the cloud service 150 are capable of retrieving a data item such as a user mailbox within a time period such as 50 milliseconds. In some implementations, the identified operation and identified data item may comprise a sequence of identified operations and identified data items and the time constraint may be for the completion of the entire sequence of identified operations. For example, the application 115 may want to learn which computing node can retrieve and update multiple data items within a time period such as 30 milliseconds.

A topology is requested at 603. The topology 175 may be requested by the cloud statistics server 190 from the cloud service 150 using the identifier of the data item and/or the identifier of the operation, for example. Alternatively, the topology 175 may be requested from a cache 195 associated with the cloud statistics server 190. In some implementations, the topology 175 may identify one or more storage nodes used to store the identified data item at the cloud service 150 and a replication strategy used by the identified storage nodes. The replication strategy may include one of more expected transfer times associated with the computing nodes and the identified storage nodes.

The topology is received at 605. In an implementation, the topology 175 may be received by the cloud statistics server 190 from the cloud service 150. Alternatively, the topology 175 may be received by the cloud statistics server 190 from the cache 195.

For each computing node, an expected completion time is determined for the computing node by combining the expected transfer time associated with the computing node and the expected transfer times associated with one or more of the identified storage nodes according to the replication strategy at 607. The determination may be made by the cloud statistics server 190.

One or more computing nodes with expected completion times that are less than the time constraint are determined at 609. The one or more nodes may be determined by the cloud statistics server 190.

Identifiers of the determined one or more computing nodes are provided at 611. The determined identifiers may be provided to the application 115 by the cloud statistics server 190. The application 115 may then select a computing node of the cloud service 150 to complete the identified operation.

Figure 7:
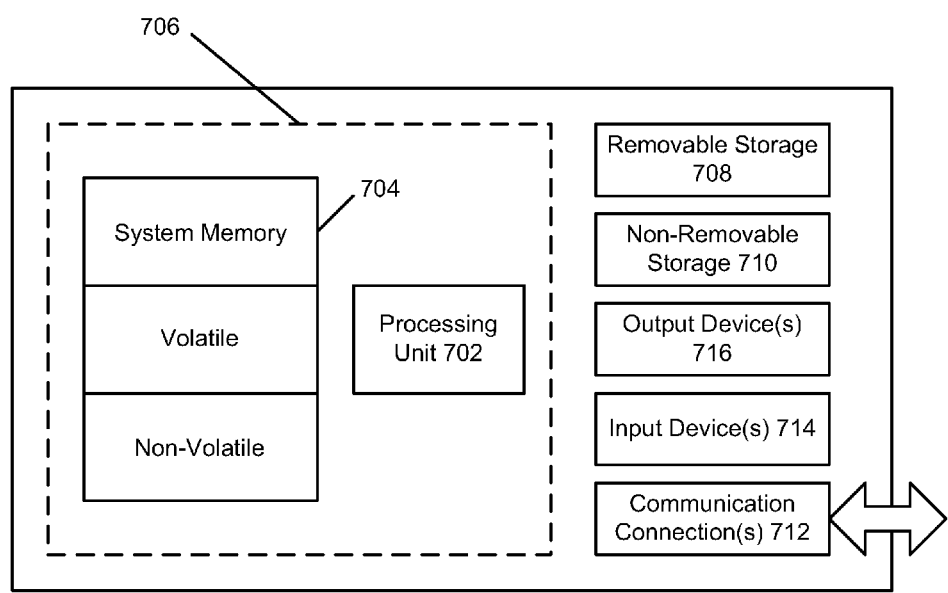
FIG. 7 shows an exemplary computing environment in which example embodiments and aspects may be implemented.

FIG. 7 shows an exemplary computing environment in which example embodiments and aspects may be implemented. An exemplary system for implementing aspects described herein includes a computing device, such as computing system 700. In its most basic configuration, computing system 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing system 700 may have additional features/functionality. For example, computing system 700 may include additional storage (removable and/or non-removable) including, but not limited to, magnetic or optical disks or tape. Such additional storage is illustrated in FIG. 7 by removable storage 708 and non-removable storage 710.

Computing system 700 typically includes a variety of computer readable media. Computer readable media can be any available media that can be accessed by computing system 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 700. Any such computer storage media may be part of computing system 700.

Computing system 700 may contain communications connection(s) 712 that allow the device to communicate with other devices. Computing system 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    receiving an identifier of a data item and an identifier of an operation at a computing device, wherein the data item is stored by a cloud service comprising a plurality of storage nodes and a plurality of computing nodes;
    requesting a topology from the cloud service using the identifier of a data item by the computing device;
    receiving the topology from the cloud service by the computing device, the topology identifying one or more storage nodes from the plurality of storage nodes used to store the identified data item and a replication strategy used by the identified one or more storage nodes;
    determining by the computing device, for each computing node of the plurality of computing nodes, an expected completion time for the computing node to complete the identified operation on the identified data item given the replication strategy used by the identified one or more of storage nodes; and
    determining a minimum expected completion time of the determined expected completion times by the computing device.

2. The method of claim 1, further comprising:
    providing the determined minimum expected completion time.

3. The method of claim 2, further comprising providing an identifier of the computing node associated with the determined minimum expected completion time.

4. The method of claim 3, further comprising causing the identified operation to be performed using the identified data item at the computing node associated with the determined minimum expected completion time.

5. The method of claim 1, wherein the replication strategy includes one or more expected transfer times associated with each of the one or more identified storage nodes and the plurality of computing nodes, and determining the expected completion time for the computing node to complete the identified operation on the identified data item given the replication strategy used by the identified one or more storage nodes comprises determining a combination of the expected transfer times between the computing node and one or more of the storage nodes identified by the replication strategy.

6. The method of claim 5, further comprising determining the combination using one or more of a summation operation, a minimum operation, and a maximum operation.

7. The method of claim 1, wherein the identified operation is one of a read operation or an update operation.

8. The method of claim 1, wherein the replication strategy comprises an erasure coding replication strategy.

9. The method of claim 1, wherein the replication strategy comprises a synchronous mirroring replication strategy.

10. The method of claim 1, wherein the topology comprises a directed graph.

11. The method of claim 1, further comprising determining, for each computing node of a subset of the plurality of computing nodes, an expected cost for the identified operation and the identified data item using the replication strategy.

12. A method comprising:
receiving an identifier of an operation, an identifier of a data item, and a time constraint by a computing device, wherein the data item is stored in a cloud service comprising a plurality of storage nodes and a plurality of computing nodes;
requesting a topology from the cloud service by the computing device using the identifier of a data item;
receiving the topology from the cloud service by the computing device, the topology identifying one or more storage nodes from the plurality of storage nodes used to store the identified data item, and a replication strategy used by the identified one or more storage nodes, wherein the replication strategy includes one or more expected transfer times associated with each of the one or more identified storage nodes and the plurality of computing nodes;
for each computing node, combining the expected transfer times associated with the computing node and one or more of the identified storage nodes according to the replication strategy to generate an expected completion time of the operation for the computing node;
determining one or more computing nodes with an expected completion time that is less than the time constraint; and
providing identifiers of the determined one or more computing nodes.

13. The method of claim 12, wherein the identified operation comprises a sequence of operations, and the identified data item comprises a plurality of identified data items.

14. The method of claim 12, wherein the topology comprises a directed graph.

15. The method of claim 12, wherein the identified operations are one of a read operation or an update operation.

16. The method of claim 12, wherein the replication strategy comprises an erasure coding replication strategy.

17. The method of claim 12, wherein the replication strategy comprises a synchronous mirroring replication strategy.

18. A system comprising:
a cloud service comprising a plurality of storage nodes and a plurality of computing nodes; and
a cloud statistics server adapted to:
receive an identifier of a data item and an identifier of an operation, wherein the data item is stored by the cloud service;
request a topology from the cloud service using the identifier of a data item;
receive the topology from the cloud service, wherein the topology identifies one or more storage nodes from the plurality of storage nodes used to store the identified data item and a replication strategy used by the identified one or more storage nodes;
determine, for each computing node of the plurality of computing nodes, an expected completion time for the computing node to complete the identified operation on the identified data item given the replication strategy used by the identified one or more of storage nodes; and
determine a minimum expected completion time of the determined expected completion times.

19. The system of claim 18, wherein the cloud statistics server is further adapted to:
provide the determined minimum expected completion time.

20. The system of claim 19, wherein the cloud statistics server is further adapted to provide an identifier of the computing node associated with the determined minimum expected completion time.

* * * * *